United States Patent
Hibino

(10) Patent No.: US 7,768,565 B2
(45) Date of Patent: Aug. 3, 2010

(54) ELECTRONIC CAMERA

(75) Inventor: Hideo Hibino, Yamato (JP)

(73) Assignee: Nikon Corporation, Tokyo (JP)

( * ) Notice: Subject to any disclaimer, the term of this patent is extended or adjusted under 35 U.S.C. 154(b) by 941 days.

(21) Appl. No.: 11/199,212

(22) Filed: Aug. 9, 2005

(65) Prior Publication Data

US 2005/0270398 A1    Dec. 8, 2005

Related U.S. Application Data

(63) Continuation of application No. PCT/JP2004/001284, filed on Feb. 6, 2004.

(30) Foreign Application Priority Data

Feb. 17, 2003  (JP)  ............... 2003-038485

(51) Int. Cl.
*H04N 5/222* (2006.01)
*H04N 5/235* (2006.01)

(52) U.S. Cl. ................... 348/333.01; 348/362
(58) Field of Classification Search ............ 348/333.01, 348/362
See application file for complete search history.

(56) References Cited

U.S. PATENT DOCUMENTS

| | | | |
|---|---|---|---|
| 5,638,120 | A | 6/1997 | Mochizuki et al. |
| 5,793,422 | A | 8/1998 | Mochizuki et al. |
| 6,058,270 | A * | 5/2000 | Seki et al. ................. 396/165 |
| 2001/0013903 | A1 | 8/2001 | Suzuki et al. |
| 2003/0160874 | A1 | 8/2003 | Kuroiwa |
| 2004/0119867 | A1 * | 6/2004 | Nishioka et al. ....... 348/333.01 |

FOREIGN PATENT DOCUMENTS

| | | |
|---|---|---|
| EP | 0-583-143 A2 | 2/1994 |
| EP | 1 045 594 A2 | 10/2000 |
| EP | 1 309 186 A1 | 5/2003 |
| JP | A 04-170164 | 6/1992 |
| JP | A 04-207791 | 7/1992 |
| JP | A 06-105243 | 4/1994 |
| JP | A 09-307818 | 11/1997 |
| JP | A 11-112865 | 4/1999 |
| JP | A-11-112866 | 4/1999 |
| JP | A 11-275455 | 10/1999 |
| JP | A-2000-115628 | 4/2000 |
| JP | A 2002-232778 | 8/2002 |
| WO | WO 02/13514 A1 | 2/2002 |

* cited by examiner

*Primary Examiner*—James M Hannett
(74) *Attorney, Agent, or Firm*—Oliff & Berridge, PLC

(57) ABSTRACT

An electronic camera capable of exposure control is disclosed which flexibly responds to situations during the display of confirmation moving image before photographing. An aspect of an electronic camera includes: an image-capturing device capturing images of subjects; a display section displaying the image outputted from the image-capturing device in real time during continuous capturing; and a control unit performing feedback control that is a repetition of a loop that corrects capturing condition based on the brightness of the image outputted from the image-capturing device, in which the control unit sets at least two kinds of capturing conditions to include entire dynamic range of the image-capturing device in first loop immediately after feedback control starts, and based on levels of brightness of at least two kinds of images outputted from the image-capturing device under the capturing conditions, calculates correct capturing conditions for images outputted following the images to obtain correct exposures.

11 Claims, 7 Drawing Sheets

ELECTRONIC CAMERA

CROSS-REFERENCE TO RELATED APPLICATION

This application is a continuation of PCT International Patent Application No. PCT/JP2004/001284, filed on Feb. 6, 2004, designating the U.S., and claims the benefit of priority from Japanese Patent Application No. 2003-038485, filed on Feb. 17, 2003, the entire contents of which are incorporated herein by reference.

TECHNICAL FIELD

The present invention relates to an electronic camera capable of displaying an image captured by an image-capturing device in real time for confirmation before photographing.

BACKGROUND ART

In an electronic camera, exposure is feedback-controlled while a confirmation moving image before photographing is being displayed (Japanese Unexamined Patent Application Publication No. 11-112865 and so on).

In the feedback control, an AE evaluation value (which is an index showing a brightness of an image) of an image (here, a confirmation moving image before photographing) outputted from an image-capturing device is referred to, and the charge storage time and the like (capturing condition, set exposure) of the image-capturing device are corrected in a direction in which exposure approaches a correct value.

Incidentally, the strength of this correction is intentionally held down, and, for instance, the correction value is, for example, approximately 25% (a correction strength of 25%) of a value which allows the exposure to instantly agree with the correct value.

If the feedback response speed is thus set slow, it takes a long time for the exposure to converge into the correct value, so that even when a sudden change such as a moving object crossing inside the screen during the display of the confirmation moving image before photographing occurs, the exposure is stabilized without the confirmation moving image before photographing flickering.

However, in this conventional electronic camera, the exposure does not instantly agree with the correct value immediately after activation, at the time of mode change, and at the beginning of the start of the feedback control, so that there is a possibility that a user misses the photographing opportunity.

Moreover, the exposure does not instantly agree with the correct value also when illumination of a subject is switched to special illumination (hereinafter used in a sense of "remarkably light or remarkably dark illumination"), for example, when an auto focus auxiliary light for metering mounted to the electronic camera is lighted, or when the light quantity of the illumination remarkably reduces. In these cases, there is a possibility that the user misses the photographing opportunity.

DISCLOSURE OF THE INVENTION

An object of the present invention is to provide an electronic camera capable of responding at high speed to changes in situations displayed.

An aspect of an electronic camera according to the present invention is that it includes: an image-capturing device which captures an image of a subject; a display section which displays the image outputted from the image-capturing device in real time during continuous capturing; and a control unit which performs feedback control that is a repetition of a loop that corrects a capturing condition based on a brightness of the image outputted from the image-capturing device, in which, in a first loop immediately after the feedback control starts, the control unit sets at least two kinds of capturing conditions to include all ranges of brightness of the subject to be imaged, and based on levels of brightness outputted from the image-capturing device for at least two images under the at least two kinds of capturing conditions, the control unit calculates a correct capturing condition for an image outputted following the images to obtain a correct exposure.

Preferably, the control unit calculates a correction value based on the brightness and a desired value to correct the capturing condition to the correct capturing condition.

Further preferably, the control unit increases a strength of the correction in the first loop compared to in succeeding second and subsequent loops.

Still further preferably, the control unit, in starting the first loop, sets predetermined capturing conditions different from each other when the at least two kinds of images are respectively captured.

Yet further preferably, the control unit, in the first loop, corrects the capturing condition based on the brightness which falls within a predetermined correct range, out of the levels of brightness of the at least two kinds of images.

Further preferably, the control unit, in the first loop, uses center-weighted metering to evaluate the levels of brightness of the at least two kinds of images.

Still further preferably includes, a power source which supplies electric power to respective sections of the electronic camera and the control unit starts the feedback control in response to activation of the power source.

Yet further preferably, the electronic camera is switchable between a photographing mode which records a photograph of an image and at least one non-photographing mode, and the control unit starts the feedback control in response to switching from the non-photographing mode to the photographing mode.

Moreover, an aspect of an electronic camera according to the present invention is that it includes: an image-capturing device which captures an image of a subject; a display section which displays the image outputted from the image-capturing device in real time during continuous capturing; and a control unit which performs feedback control that is a repetition of a loop that corrects a capturing condition based on a brightness of the image outputted from the image-capturing device, in which the control unit increases a strength of the correction when the brightness is outside a predetermined range compared to when the brightness is within the predetermined range.

Further, an aspect of an electronic camera according to the present invention is that it includes: an image-capturing device which captures an image of a subject; a display section which displays the image outputted from the image-capturing device in real time during continuous capturing; a control unit which performs feedback control that is a repetition of a loop that corrects a capturing condition based on a brightness of the image outputted from the image-capturing device; and an illumination unit which is lighted based on the brightness of the image outputted from the image-capturing device, in which the control unit increases a strength of the correction when said illumination part is lighted compared to when the illumination unit is not lighted.

Furthermore preferably, the control unit, in the first loop, sets at least two kinds of capturing conditions having different charge storage times of the image-capturing device.

According to the present invention, it realizes an electronic camera capable of exposure control which flexibly responds to a situation during the display of a confirmation moving image before photographing.

More specifically, it realizes an electronic camera capable of rapidly optimizing exposure immediately after the display of a confirmation moving image before photographing starts.

Moreover, it realizes an electronic camera capable of rapidly optimizing exposure immediately after illumination of a subject is switched to special illumination during the display of a confirmation moving image for photographing.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

BEST MODE FOR CARRYING OUT THE INVENTION

Embodiments of the present invention will be described below with reference to the drawings.

First Embodiment

A first embodiment of the present invention will be described with reference to FIG. 1, FIG. 2, FIG. 3, FIG. 4, and FIG. 5.

This embodiment is an embodiment of an electronic camera.

Figure 1:
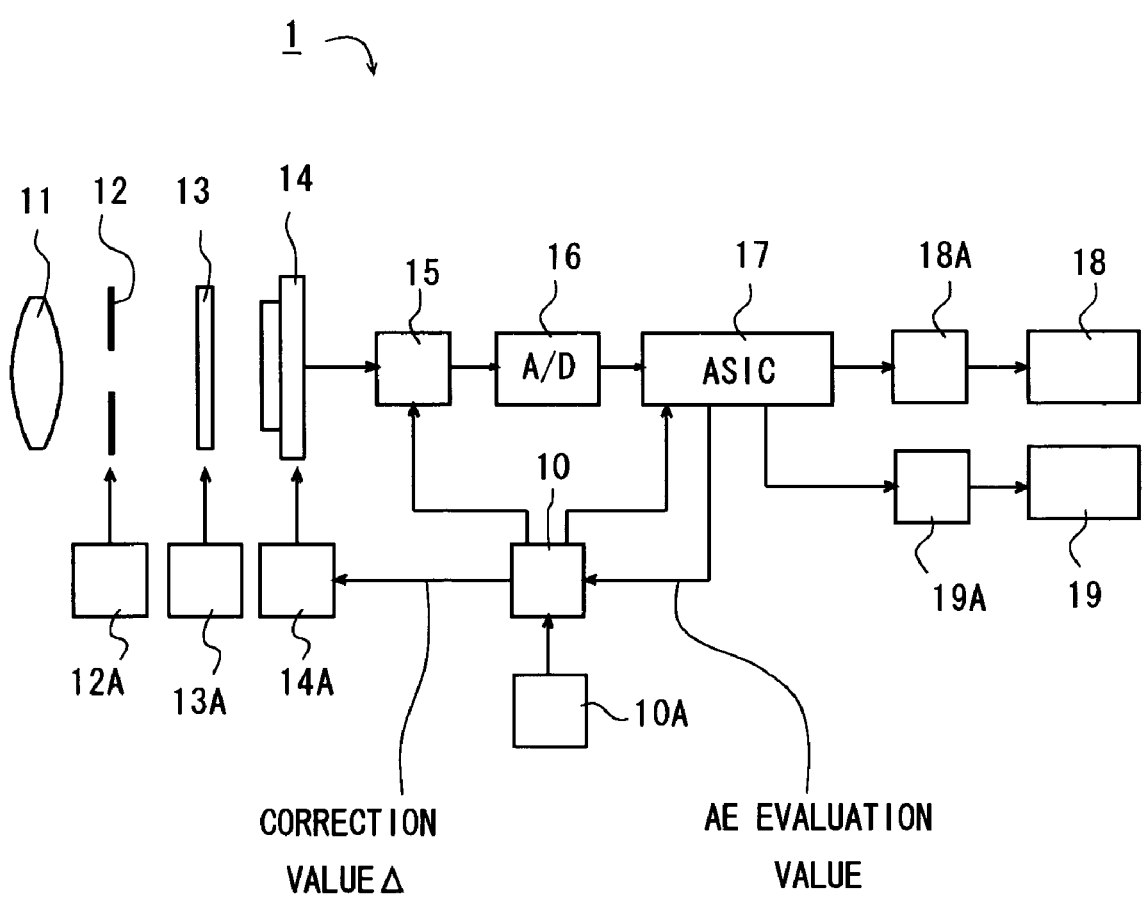
FIG. 1 is a block diagram of an electronic camera 1 of a first embodiment.

FIG. 1 is a block diagram of an electronic camera 1 of this embodiment. Incidentally, although the present invention is applicable to an electronic camera with a separate-type lens, here, a case where the present invention is applied to the electronic camera 1 with an integral-type lens will be described.

The electronic camera 1 includes a control circuit 10, an operation button 10A, a photographing lens 11, an aperture mechanism 12, an aperture driving circuit 12A, a shutter mechanism 13, a shutter driving circuit 13A, a CCD image-capturing device 14, an image-capturing device driving circuit 14A, a gain adjusting circuit 15, an A/D converting circuit 16, an image processing circuit 17 such as an ASIC, a monitor 18 such as a liquid crystal display device, a display controlling circuit 18A, a compression circuit 19A, and so on. Numeral 19 denotes a storage medium such as an insertable/removable memory card.

A luminous flux from a subject is incident on the photographing lens 111 and forms an image on the CCD image-capturing device 14 via the aperture mechanism 12 and the shutter mechanism 13.

A user can give an instruction for capturing and an instruction for AE lock (locking of a set exposure) to the electronic camera 1 and set a metering mode (multi-segment metering, center-weighted metering, or the like) and an ISO speed via the operation button 10A.

When recognizing the user's instruction for capturing and instruction for AE lock from the state of the operation button 10A, according to these instructions, the control circuit 10 gives instructions to respective sections in the electronic camera 1, and when recognizing the metering mode set by the user from the state of the operation button 10A, the control circuit 10 sets the metering mode for the image processing circuit 17.

Further, when recognizing the ISO speed set by the user from the state of the operation button 10A, the control circuit 10 sets a gain corresponding to the ISO speed for the gain adjusting circuit 15.

(Display of Confirmation Moving Image Before Photographing)

In the electronic camera 1 thus configured, a confirmation moving image before photographing is displayed in the following manner under an instruction of the control circuit 10 according to a power-on operation, a switching operation from a non-photographing mode such as an image reproducing mode to an image photographing mode in an operation mode of the electronic camera 1, and so on.

The aperture driving circuit 12A sets the aperture value of the aperture mechanism 12 to a predetermined value (for example, an open value).

The shutter driving circuit 13A keeps the shutter mechanism 13 in an open state.

The image-capturing device driving circuit 14A drives the CCD image-capturing device 14 in a high-speed reading mode.

An image (here, the confirmation moving image before photographing) outputted from the CCD image-capturing device 14 is successively inputted to the image processing circuit 17 via the gain adjusting circuit 15 and the A/D converting circuit 16 in sequence.

The confirmation moving image before photographing successively inputted to the image processing circuit 17 is successively displayed on the monitor 18 via the display controlling circuit 18A.

During the display of this confirmation moving image before photographing, exposure control (which is feedback control) is performed in the following manner.

The image processing circuit 17 extracts an AE evaluation value from the confirmation moving image before photographing of each frame outputted from the CCD image-capturing device 14 by the metering mode previously set by the user, or the like.

The AE evaluation value extracted by the image processing circuit 17 is referred to by the control circuit 10, and an instruction to correct the charge storage time of the CCD image-capturing device 14 in a direction in which exposure approaches a correct value is given to the image-capturing device driving circuit 14A.

In the feedback control, this loop is repeated.

Incidentally, the correction of the exposure can be realized not only by changing the charge storage time of the CCD image-capturing device 14 but also by changing the shutter open time by the shutter mechanism 13 and changing the aperture value by the aperture mechanism 12, but during the display of the confirmation moving image before photographing, the shutter is fixed open.

If the instruction for AE lock is inputted from the user during the display of the confirmation moving image before photographing, the correction value of the charge storage time becomes zero independently of the AE evaluation value extracted by the image processing circuit 17, and the set exposure is fixed.

Thereafter, when the instruction for capturing is inputted from the user, various settings by the user are reflected in respective sections, and in addition, the aperture value, the shutter speed, and the charge storage time to realize the above-described fixed set exposure are set for the aperture driving circuit 12A, the shutter driving circuit 13A, and the image-capturing device driving circuit 14A, respectively. Then, under these settings, the image-capturing device driving circuit 14A drives the CCD image-capturing device 14 in a still image recording mode.

An image (here, a still image) outputted from the CCD image-capturing device 14 is inputted to the image processing circuit 17 via the gain adjusting circuit 15 and the A/D converting circuit 16 in sequence.

The still image inputted to the image processing circuit 17 is written to the storage medium 19 after being compressed by the compression circuit 19A as required.

At a point in time when the process to capture this still image is completed, the above-described respective processes to display the confirmation moving image before photographing are resumed.

Figure 2:
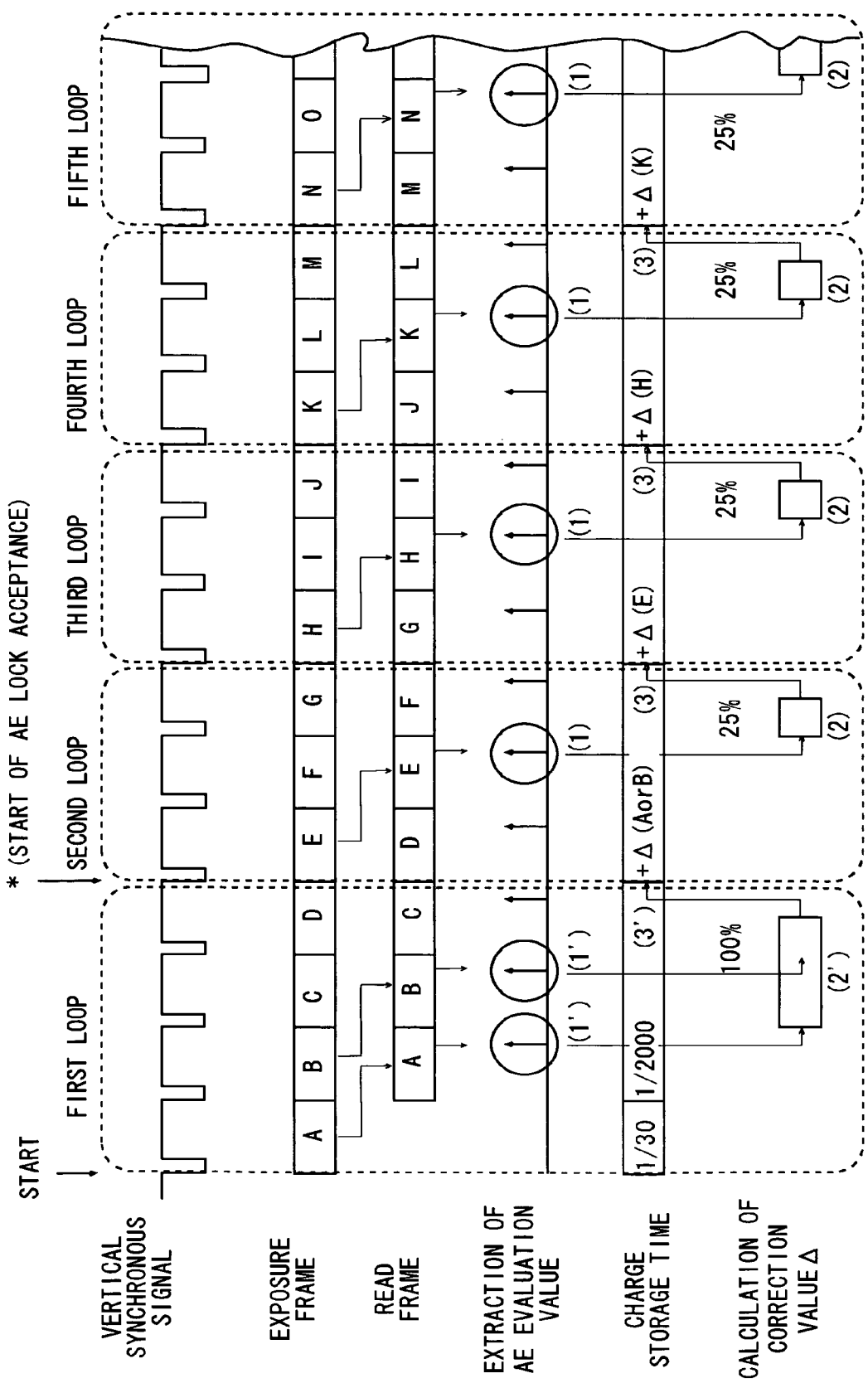
FIG. 2 is a timing chart of respective processes concerned with exposure control (feedback control) of the first embodiment.

FIG. 2 is a timing chart of respective processes concerned with the exposure control (feedback control) of this embodiment.

In the feedback control of this embodiment, there is a difference between a first loop immediately after the start of the feedback control and each loop of second and subsequent loops. First, a process of each loop of the second and subsequent loops will be described, and then, a process of the first loop will be described.

In each loop of the second and subsequent loops, the image processing circuit 17 adopts the metering mode set by the user as a metering mode when the AE evaluation value is extracted from the confirmation moving image before photographing.

The process of FIG. 2(1) is a process in which the control circuit 10 refers to the extracted AE evaluation value, the process of FIG. 2(2) is a process in which the control circuit 10 finds a correction value Δ based on the AE evaluation value, and the process of FIG. 2(3) is a process in which the control circuit 10 instructs the image-capturing device driving circuit 14A to change the charge storage time of the CCD image-capturing device 14 by the correction value Δ.

Here, the time required from when the exposure of a frame is started until the set exposure is actually corrected based on the AE evaluation value of the frame corresponds to three frames.

Therefore, each loop of the second and subsequent loops is executed once every three frames based on the AE evaluation value of one frame.

Moreover, in each loop of the second and subsequent loops, to slow down the feedback response speed, the above-described correction value Δ is held to approximately 25% (a correction strength of 25%) of a value which allows the exposure to instantly agree with a correct value.

Next, the process of the first loop will be described.

Figure 3:
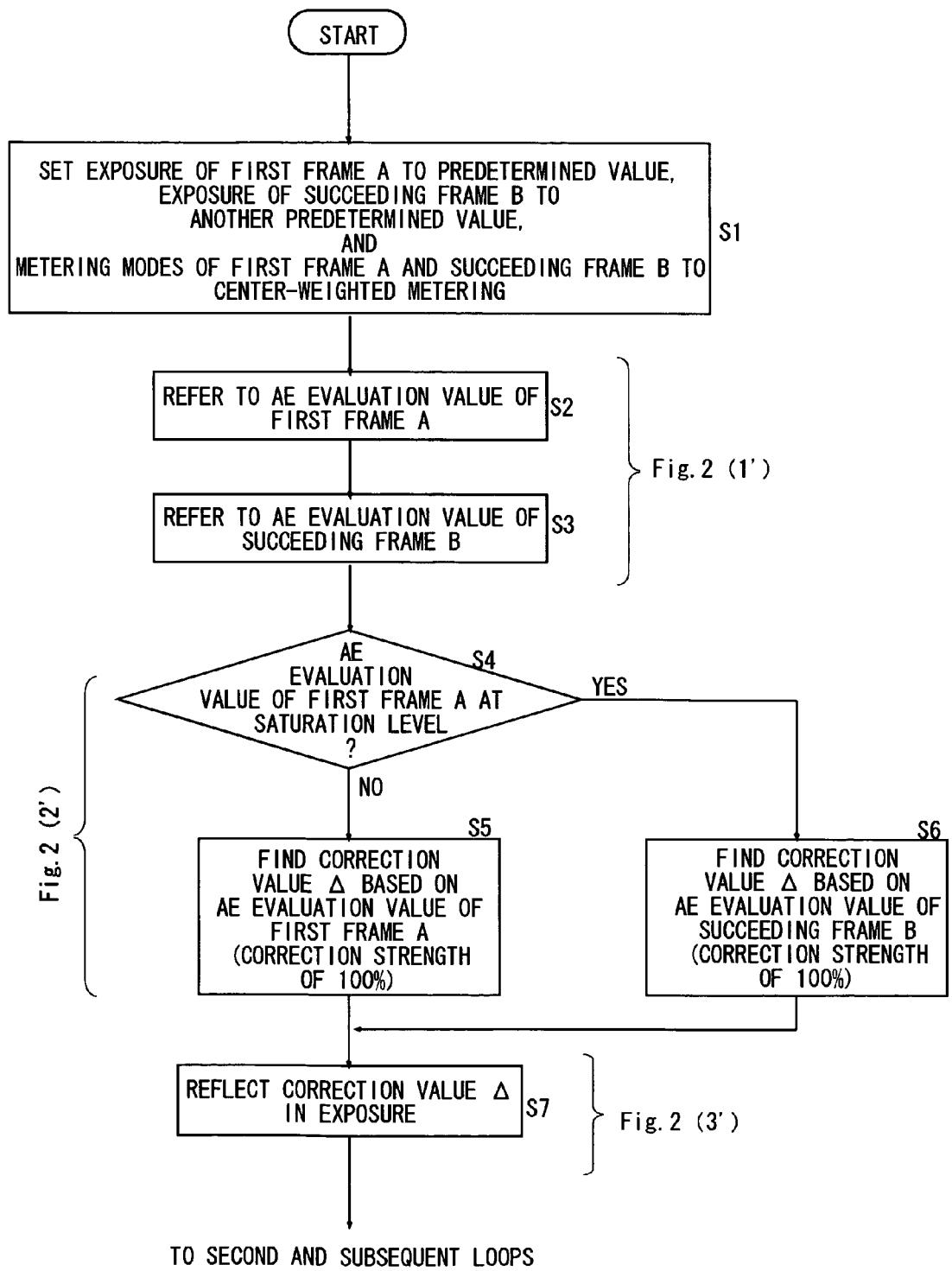
FIG. 3 is a flowchart describing a process of a first loop of the feedback control of the first embodiment.

FIG. 3 is a flowchart describing the process of the first loop of the feedback control of this embodiment. Incidentally, steps S2 and S3 correspond to the process of FIG. 2(1'), steps S4, S5, and S6 correspond to the process of FIG. 2(2'), and step S7 corresponds to the process of FIG. 2(3').

In the process of the first loop, the set exposure of a first frame A is set to a predetermined value, and the set exposure of a succeeding frame B is set to another predetermined value. These set exposures are respectively set according to the charge storage time of the CCD image-capturing device 14.

A description will be given below, assuming that the set exposure of the first frame A is set to a large predetermined value (exposure time T=1/30 sec, aperture is open) and the set exposure of the succeeding frame B is set to a small predetermined value (exposure time T=1/2000 sec, aperture is open).

Further, in the first loop, irrespective of the user's setting, the image processing circuit 17 adopts the center-weighted metering as the metering mode when the AE evaluation value is extracted from the confirmation moving image before photographing.

Furthermore, in the first loop, irrespective of the user's setting, the gain adjusting circuit 15 sets a predetermined value, for example, a value corresponding to an ISO speed of 100 as the gain (the above is step S1 in FIG. 3).

Then, both the AE evaluation value extracted from the first frame A of the confirmation moving image before photographing and the AE evaluation value extracted from the succeeding frame B subsequent thereto are referred to (steps S2 and S3 in FIG. 3, FIG. 2(1')).

Figure 4:
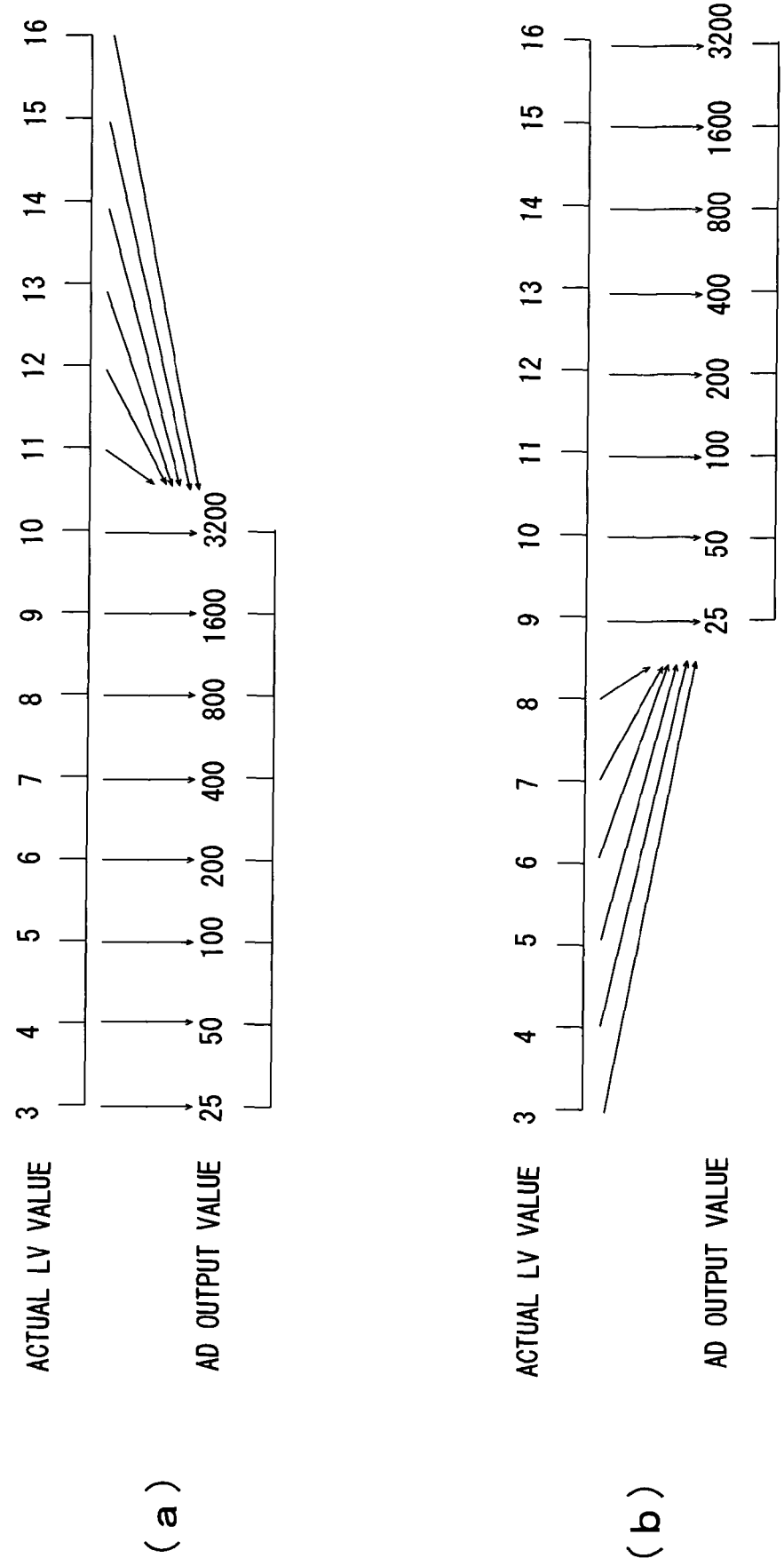
FIG. 4(a) of FIG. 4 is a diagram showing a signal value of a first frame A acquired at a large set exposure.
FIG. 4(b) is a diagram showing a signal value of a succeeding frame B acquired at a small set exposure.

FIG. 4(*a*) shows a signal value of the first frame A acquired at the large set exposure, and FIG. 4(*b*) shows a signal value of the succeeding frame B acquired at the small set exposure. In FIGS. 4(*a*) and (*b*), the upper row shows an actual LV value, and the lower row shows an output value of the 12-bit A/D converting circuit 16.

As is clear from a comparison between FIGS. 4(*a*) and (*b*), if the set exposures are different, the signal values differ even if subject levels of brightness are the same (here, the LV values are the same).

Since the dynamic range of the CCD image-capturing device 14 is limited, when the set exposure is large (FIG. 4(*a*)), the signal value of the relatively bright subject (an LV value between 11 and 16) is saturated at a saturation level of "4095", but the signal value of the relatively dark subject (an LV value between 3 and 9) takes on a value according to the actual LV value.

On the other hand, when the set exposure is small (FIG. 4(*b*)), the signal value of the relatively dark subject (an LV value between 3 and 8) is buried in a noise level of "25" or lower, but the signal value of the relatively bright subject (an LV value between 9 and 16) takes on a value according to the actual LV value.

Accordingly, concerning the relatively dark subject (an LV value between 3 and 10), the accuracy of the evaluation of brightness can be further improved when the AE evaluation value of the frame acquired at the large set exposure is used, and concerning the relatively bright subject (an LV value between 9 and 16), the accuracy thereof can be further improved when the AE evaluation value of the frame acquired at the small set exposure is used.

Hence, the control circuit 10 in the first loop judges whether the AE evaluation value of the first frame A is at a predetermined exposure value determinable level (a level corresponding to an AD output value of 3200 or lower) (step S4 in FIG. 3), and if it is at the exposure value determinable level (YES in step S4 in FIG. 3), the subject brightness is regarded as relatively low, and the correction value Δ is found based on the AE evaluation value of the first frame A acquired at the large set exposure and its exposure (step S5 in FIG. 3).

On the other hand, when the AE evaluation value of the first frame A exceeds the predetermined exposure value determinable level (NO in step S4 in FIG. 3), the subject brightness is regarded as relatively high, and the correction value Δ is found based on the AE evaluation value of the succeeding frame B acquired at the small set exposure and its exposure (step S6 in FIG. 3) (the above is FIG. 2(2')).

Moreover, in this first loop, to increase the feedback response speed, the correction strength is increased. More specifically, the correction value Δ found in steps 55 or 56 is 100% (a correction strength of 100%) of the value which allows the exposure to instantly agree with the correct value.

The image-capturing device driving circuit 14A changes the charge storage time of the CCD image-capturing device 14 by the correction value Δ thus found (step 57 in FIG. 3, FIG. 2(3')).

As described above, the first loop is based not only on the first frame A but also on the succeeding frame B, and hence the evaluation of the brightness of the confirmation moving image before photographing can be performed with high accuracy, whereby the correction value Δ is found with a high degree of accuracy.

Consequently, even if its correction strength is increased (to 100%), the possibility that the exposure deviates to an incorrect value is extremely low.

Figure 5:
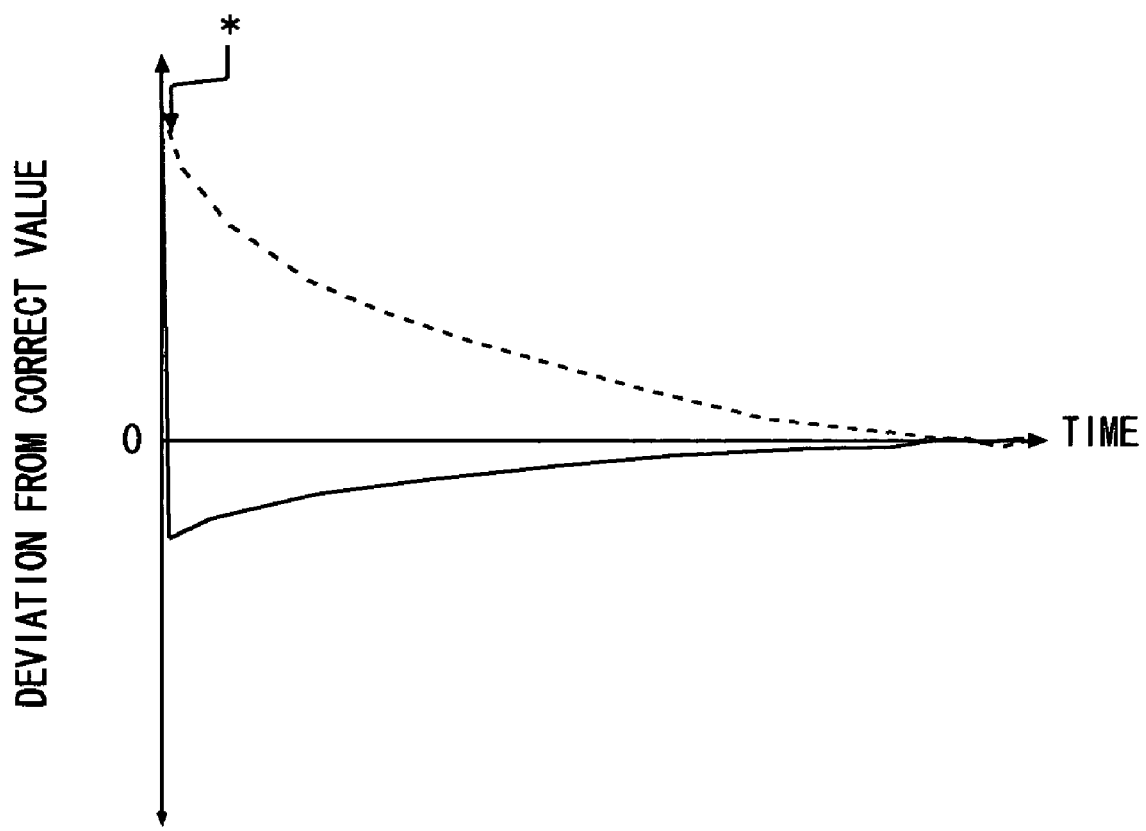
FIG. 5 is a diagram comparing the feedback control of the first embodiment and conventional feedback control.

FIG. 5 is a diagram comparing the feedback control of this embodiment and conventional feedback control. Incidentally, in FIG. 5, the solid line shows this embodiment, and the dotted line shows the conventional one. Moreover, the horizontal axis shows an elapsed time from when the feedback control is started, and the vertical axis shows a deviation from the correct value of the exposure (incidentally, data shown in FIG. 5 is an example of data obtained when some particular subject is displayed as the confirmation moving image before photographing).

As is obvious if FIG. 5 is referred to, according to the feedback control of this embodiment, the exposure becomes the correct value at the conclusion (a mark *) of the first loop.

This is a manifestation of a fast feedback response speed in the first loop and high accuracy of calculation of the correction value Δ in the first loop.

As described above, according to the electronic camera 1 of this embodiment, the exposure immediately after the display of the confirmation moving image before photographing is started is optimized rapidly.

Incidentally, in the electronic camera 1, from this point in time (the mark *), the acceptance of the instruction of the AE lock by the user and correct display of the confirmation moving image before photographing on the monitor 18 become possible.

Assuming that the period required to read one frame is 33.3 ms, the acceptance of the instruction of the AE lock by the user and correct display of the confirmation moving image before photographing on the monitor 18 become possible from a point in time when the elapsed time from the start of the feedback control is approximately 133 ms.

Second Embodiment

A second embodiment of the present invention will be described with reference to FIG. 6 and FIG. 7.

This embodiment is also an embodiment of the electronic camera. Incidentally, here, only a point of difference from the electronic camera 1 of the first embodiment will be described, and a description of the other points will be omitted.

The electronic camera of this embodiment has the same configuration as shown in FIG. 1, similarly to the electronic camera 1 of the first embodiment.

The point of difference is especially in each loop of the second and subsequent loops of the exposure control (feedback control) during the display of the confirmation moving image before photographing.

Figure 6:
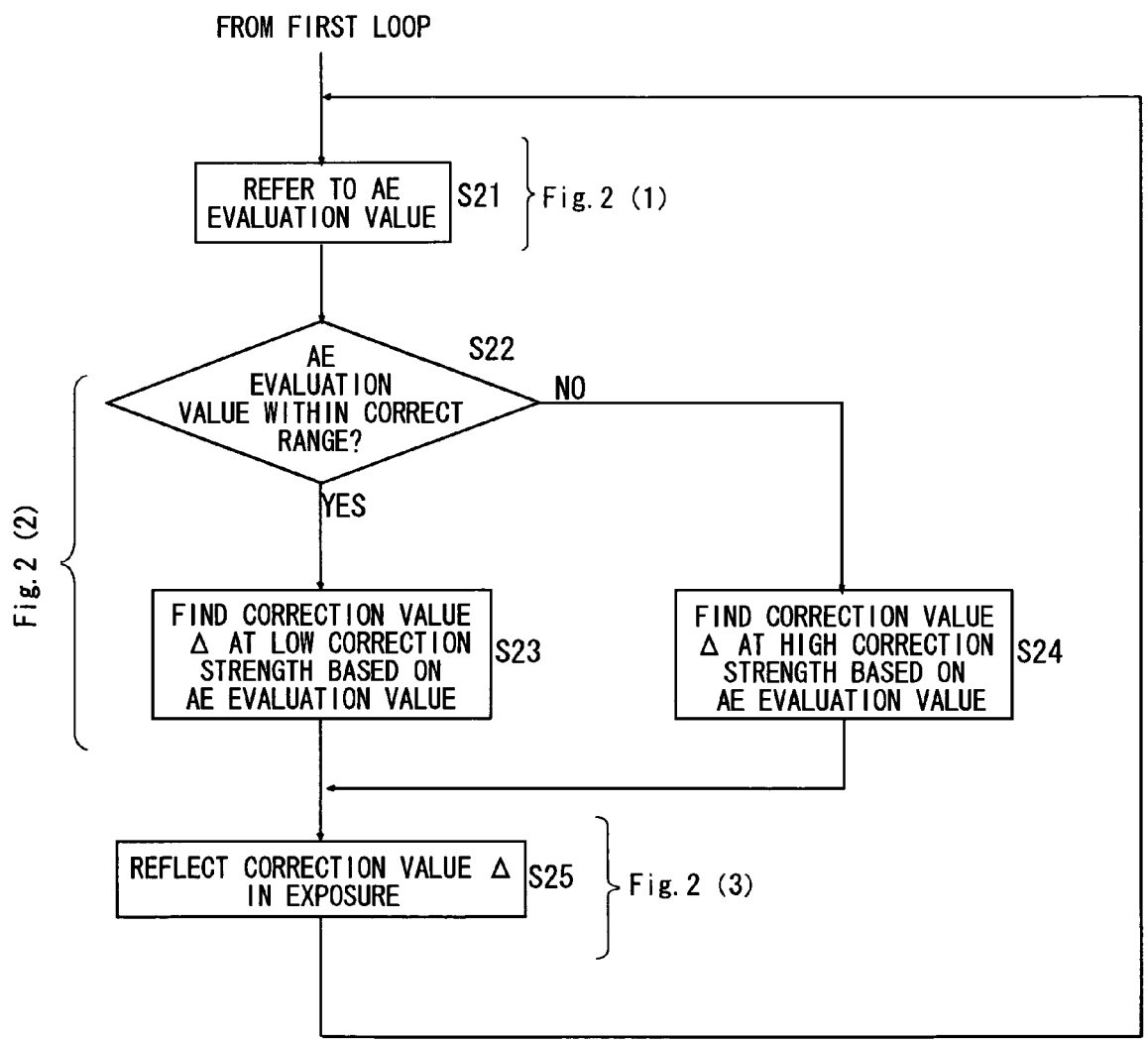
FIG. 6 is a flowchart describing a process of each loop of second and subsequent loops of feedback control of a second embodiment.

FIG. 6 is a flowchart describing a process of each loop of the second and subsequent loops of the feedback control of this embodiment. Incidentally, step S21 corresponds to the process of FIG. 2(1), the steps S22, S23, and S24 correspond to the process of FIG. 2(2), and step S25 corresponds to the process of FIG. 2(3).

In each loop of the second and subsequent loops, similarly to each loop of the second and subsequent loops in the first embodiment, the image processing circuit 17 adopts the metering mode set by the user as the metering mode when the AE evaluation value is extracted from the confirmation moving image before photographing.

Further, the extracted AE evaluation value is referred to by the control circuit 10 (step S21 in FIG. 6, FIG. 2(1)), the correction value Δ is found based on the AE evaluation value (step S23 in FIG. 6, FIG. 2(2)), and an instruction to change the charge storage time of the CCD image-capturing device 14 by the found correction value Δ is given to the image-capturing device driving circuit 14A (step S25 in FIG. 6, FIG. 2(3)).

Furthermore, in step S23, to slow down the feedback response speed, the correction value is held low, for example, to approximately 25%.

However, in a step previous to step S23, the control circuit 10 of this embodiment judges whether the AE evaluation value falls within a predetermined range (step S22), and if it is judged that it does not fall within the predetermined range (step S22 NO), illumination on the subject is regarded as being switched to special illumination (lighting of an auxiliary light source for ranging, or the like), and the correction strength is increased, for example, to 50% (step S24).

Figure 7:
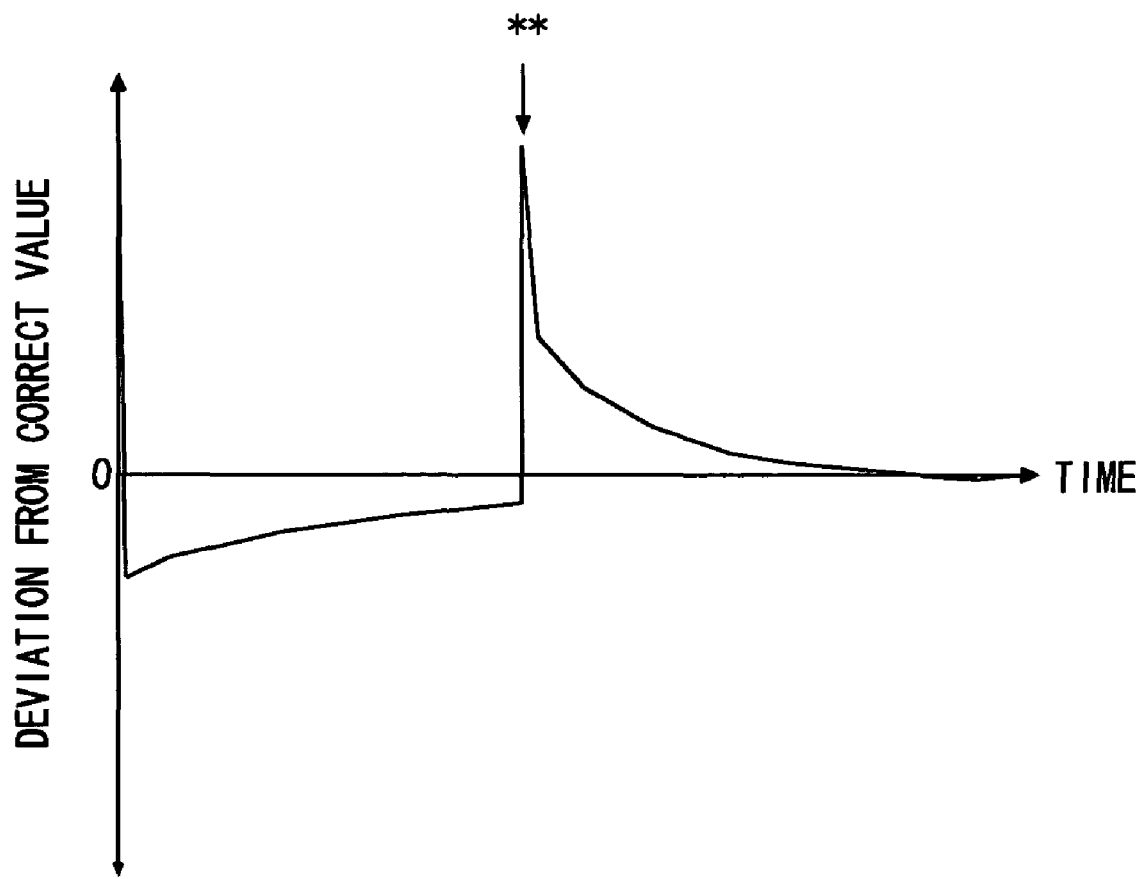
FIG. 7 is a diagram describing the feedback control of the second embodiment.

FIG. 7 is a diagram describing the feedback control of this embodiment. Incidentally, in FIG. 7, the horizontal axis shows an elapsed time from when the feedback control is started, and the vertical axis shows a deviation from the correct value of the exposure (incidentally, data shown in FIG. 7 is an example of data obtained when some particular subject is displayed as the confirmation moving image before photographing).

A mark ** shows a point in time when the illumination on the subject is switched to the special illumination.

The feedback response speed immediately after switching to the special illumination becomes faster as compared with that therebefore and thereafter, and the exposure rapidly approaches the correct value.

This is a manifestation of the fact that it is judged that the AE evaluation value does not fall within the predetermined range and thereby the correction strength is increased.

Therefore, according to the electronic camera of this embodiment, the exposure immediately after the illumination on the subject is switched to the special illumination is rapidly optimized.

In the electronic camera of this embodiment as above, the acceptance of the instruction of the AE lock by the user and correct display of the confirmation moving image before photographing on the monitor 18 are possible even immediately after switching to the special illumination.

[Others]

Incidentally, in the first embodiment, the control circuit 10 refers to the levels of brightness of two images in the first loop of the feedback control, but may refer to levels of brightness of three images.

Further, in the first embodiment, the control circuit 10 refers to the levels of brightness of plural continuous images in the first loop of the feedback control, but may refer to levels of brightness of discontinuous plural images.

However, the correction value Δ can be calculated most efficiently if the continuous two images are referred to as described above.

Moreover, in the second embodiment, the correction strength is increased when the AE evaluation value does not fall within the predetermined value, but the correction strength may be increased only when the AE evaluation value exceeds a predetermined value. In this case, the exposure immediately after switching to remarkably bright special illumination can be rapidly optimized.

Further, the correction strength may be increased only when the AE evaluation value is less than the predetermined value. In this case, the exposure immediately after switching to remarkably dark special illumination can be rapidly optimized.

Furthermore, in the electronic camera of the second embodiment, the process of the first loop of the feedback control may be performed in the same manner as the process of each loop of the second and subsequent loops.

Besides, in the electronic camera of the second embodiment, the switching to the special illumination is determined based on the AE evaluation value, and the correction value Δ is fixed according to the determination (steps S22 to S24), but the electronic camera can be also configured so that the correction value Δ is fixed based on the presence or absence of lighting of the special illumination.

For example, in the electronic camera with a built-in auxiliary light source for ranging (for example, which is automatically lighted according to the brightness of the image), the presence or absence of lighting of the auxiliary light source can be instantly recognized, whereby the correction value Δ can be fixed instantly.

The invention is not limited to the above embodiments and various modifications may be made without departing from the spirit and scope of the invention. Any improvement may be made in part or all of the components.

What is claimed is:

1. An electronic camera, comprising:
    an image-capturing device which captures an image of a subject;
    a display section which displays the image outputted from said image-capturing device in real time during continuous capturing as a confirmation moving image before an instruction for capturing; and
    a control unit which performs feedback control that is a repetition of a loop that performs correction of a capturing condition based on a brightness of the image outputted from said image-capturing device, so that an exposure of said confirmation moving image before an instruction for capturing approaches a correct value, wherein
    in a first loop immediately after the feedback control starts, said control unit sets at least a high-exposing capturing condition having a long charge storage time to include without saturation a whole range of brightness when a dark subject is to be imaged and a low-exposing capturing condition having a short charge storage time to include without saturation a whole range of brightness when a bright subject is to be imaged, and based on levels of brightness outputted from said image-capturing device for at least two images under said capturing conditions, the control unit sets a value of said correction using a full correction strength that lets an image outputted following the images to instantly obtain a correct exposure.

2. The electronic camera according to claim 1, wherein said control unit calculates a correction value based on said brightness and a desired value to correct said capturing condition to a correct capturing condition.

3. The electronic camera according to claim 1, wherein said control unit decreases a strength of said correction in succeeding second and subsequent loops compared to in said first loop.

4. The electronic camera according to claim 1, wherein said control unit, in starting said first loop, sets predetermined capturing conditions different from each other when said at least two kinds of images are respectively captured.

5. The electronic camera according to claim 4, wherein said control unit, in said first loop, corrects said capturing condition based on the brightness which falls within a predetermined correct range, out of the levels of brightness of said at least two kinds of images.

6. The electronic camera according to claim 1, wherein said control unit, in said first loop, uses center-weighted metering to evaluate the levels of brightness of said at least two kinds of images.

7. The electronic camera according to claim 1, further comprising
    a power source which supplies electric power to respective sections of the electronic camera, and wherein
    said control unit starts said feedback control in response to activation of said power source.

8. The electronic camera according to claim 1, wherein:
    said electronic camera is switchable between a photographing mode which records a photograph of an image and at least one non-photographing mode, and
    said control unit starts said feedback control in response to switching from said non-photographing mode to said photographing mode.

9. An electronic camera, comprising:
    an image-capturing device which captures an image of a subject;
    a display section which displays the image outputted from said image-capturing device in real time during continuous capturing as a confirmation moving image before an instruction for capturing; and
    a control unit which performs feedback control that is a repetition of a loop that performs a correction of a capturing condition based on a brightness of the image outputted from said image-capturing device, so that an exposure of said confirmation moving image before an instruction for capturing approaches a correct value, wherein
    in a first loop immediately after the feedback control starts, said control unit sets at least a high-exposing capturing condition having a long charge storage time to include without saturation a whole range of brightness when a dark subject is to be imaged and a low-exposing capturing condition having a short charge storage time to include without saturation a whole range of brightness when a bright subject is to be imaged, and based on levels of brightness outputted from said image-capturing device for at least two images under said capturing conditions, the control unit sets a value of said correction using a full correction strength that lets an image outputted following the images to instantly obtain a correct exposure; and in a second and subsequent loops succeeding the first loop, said control unit sets the value of said correction using a second correction strength which is weaker than said full correction strength when brightness of the image outputted from said image-capturing device is within a predetermined range, and sets the value of said correction using a third correction strength which is weaker than said full correction strength and stronger than said second correction strength when said brightness is outside said predetermined range.

10. An electronic camera, comprising:

an image-capturing device which captures an image of a subject;

a display section which displays the image outputted from said image-capturing device in real time during continuous capturing as a confirmation moving image before an instruction for capturing;

a control unit which performs feedback control that is a repetition of a loop that corrects a capturing condition based on a brightness of the image outputted from said image-capturing device, so that an exposure of said confirmation moving image before an instruction for capturing approaches a correct value; and an illumination unit which is lighted based on the brightness of the image outputted from said image-capturing device, wherein in a first loop immediately after the feedback control starts, said control unit sets at least a high-exposing capturing condition having a long charge storage time to include without saturation a whole range of brightness when a dark subject is to be imaged and a low-exposing capturing condition having a short charge storage time to include without saturation a whole range of brightness when a bright subject is to be imaged, and based on levels of brightness outputted from said image-capturing device for at least two images under said at least two kinds of capturing conditions, the control unit sets a value of said correction using a full correction strength that lets an image outputted following the images to instantly obtain a correct exposure; and in a second and subsequent loops succeeding the first loop, said control unit sets the value of said correction using a second correction strength which is weaker than said full correction strength when said illumination unit is not lighted, and sets the value of said correction using a third correction strength which is weaker than said full correction strength and stronger than said second correction strength when said illumination unit is lighted.

11. The electronic camera according to claim 1, wherein said control unit, in said first loop, sets the capturing conditions having different charge storage times of said image-capturing device.

* * * * *